Jan. 31, 1928.

A. H. LEIPERT 1,657,510

CARRIER FOR FLOATING BEVELS

Filed March 8, 1926

Patented Jan. 31, 1928.

1,657,510

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

CARRIER FOR FLOATING BEVELS.

Application filed March 8, 1926. Serial No. 93,095.

Heretofore in drives for motor vehicles, the bevel ring gear serving as the driving gear for the differential has been rigidly connected to the carrier for the sun pinions. This has tended, under conditions of momentary overloads, to a possible destruction of the gearing since the teeth of the gear and the pinion on the propeller shaft then have a tendency to be forced out of mesh. The distortion resulting has further impressed great strains on the differential gearing and its connections with the live axles. To obviate this distortion and tendency to separation of the gear teeth it is proposed according to the present invention to provide a construction wherein limited displacement is permitted between the bevel gear and the carrier for the sun pinions without sacrifice of the driving torque while the alignment of the pinion and gear teeth is provided for by the provision of suitably distributed bearings. More particularly the carrier for the sun pinions of the differential is supported within a supplemental carrier with which the bevel gear is carried, and the drive between the carrier and the supplemental carrier is effected by a spline connection having provision for a degree of displacement. The supplemental carrier may take the form of a unitary forging upon which the bevel gear is formed or it may take the form of a composite carrier to which the bevel gear is secured by the bolts maintaining the parts thereof together.

In order that the invention may be clearly understood and readily carried into effect the same will now be described more fully with reference to the accompanying drawings illustrating preferred embodiments thereof, in which.

Figure 1:
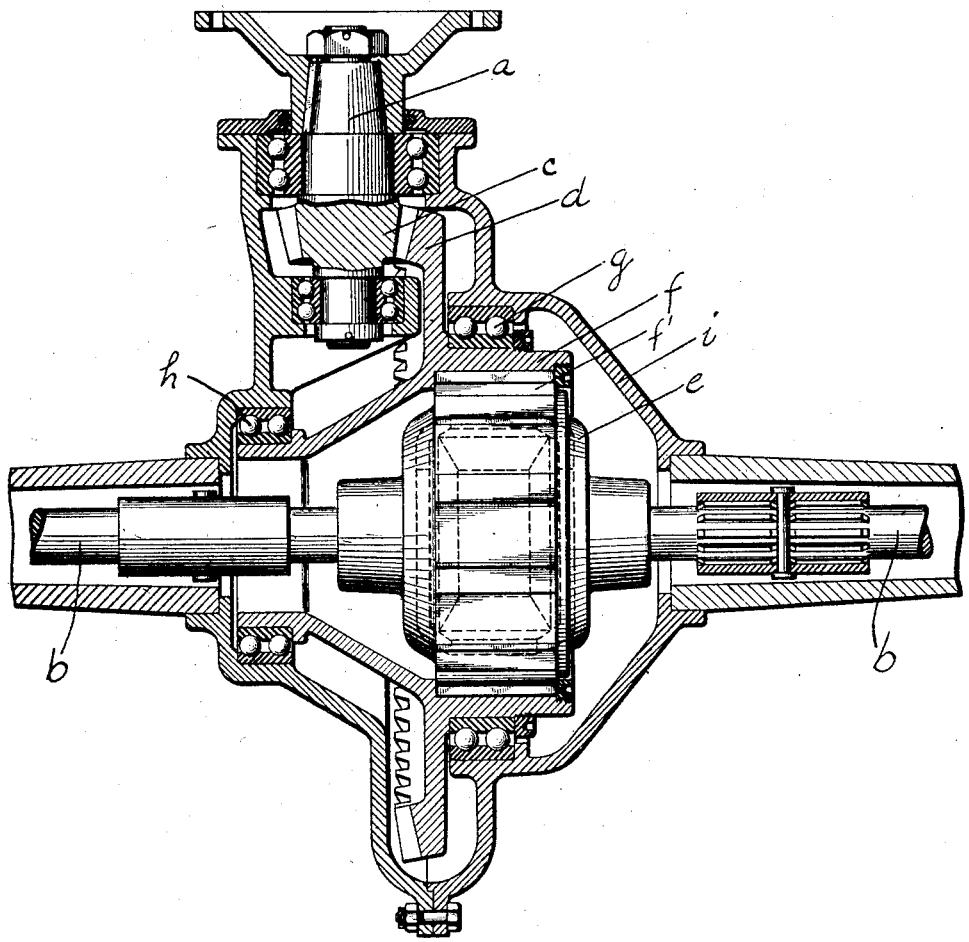
Figure 1 is a horizontal sectional view showing an axle and rear end drive according to the invention wherein a bevel gear to be driven by a bevel pinion on the propeller shaft is carried with or formed on a housing or carrier within which the differential gearing as a unit is adapted to float.

Referring first to Figure 1 the drive is effected, as is usual, from the propeller shaft or its continuation $a$ to the driving wheels (not shown) on the live axle sections $b$, $b$ through the intervention of the bevel pinion $c$ carried on the stub shaft $a$ and the bevel ring gear $d$ which is adapted to cause the rotation of the carrier $e$ for the sun pinions of the differential. Instead, however, of rigidly securing the ring gear $d$ directly to the carrier $e$ as heretofore, it is proposed to permit a degree of what may be termed universal movement between the carrier and the gear in order that under conditions of momentary overload the distortion or displacement of the carrier will not tend to effect a disengagement of the teeth of the bevel gear and pinion. To this end the ring gear $d$ is formed upon a unitary supplemental carrier $f$ which floats in bearings $g$, $h$, carried in the dead axle $i$ whereby it is always so positioned that its teeth are maintained in engagement with the bevel pinion $c$. The drive between the bevel gear $d$ and the carrier $e$ is then effected by a spline connection indicated by the splines or serrations $e'$ on the carrier and interengaging splines or serrations $f'$ on the supplemental carrier $f$. Thus movement of the carrier $e$ is permitted in vertical planes through its center without carrying with it the gear $d$.

Figure 2:
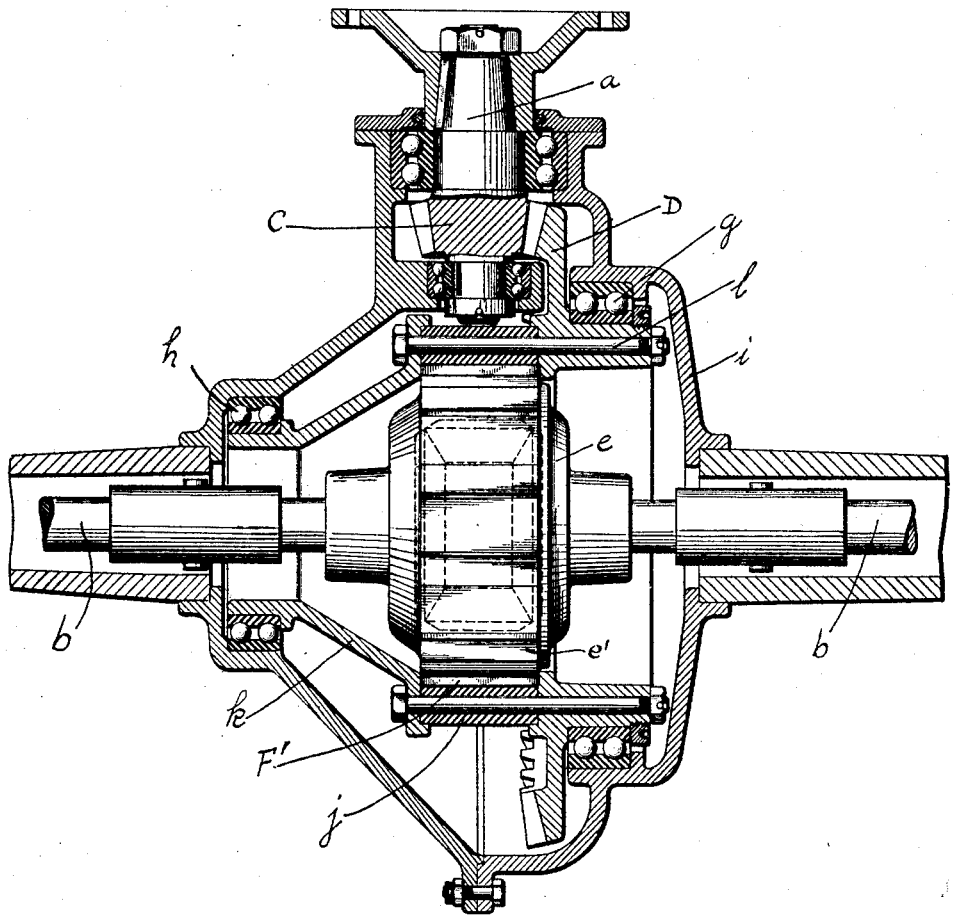
Figure 2 is a view similar to Figure 1 but showing a composite carrier whereof the parts are bolted together.

The supplemental carrier $f$ may be formed as a unitary casting on which the ring gear is formed as shown in Figure 1 or it may be formed as a composite structure as shown in Figure 2 wherein the ring gear D, an annulus $j$ carrying the splines F' and a bearing seat member $k$ are secured together as by bolts $l$ to form the counterpart of the carrier $f$.

Thus it will be seen, by the construction described, that the alignment of the bevel gear and pinion in a rear or driving axle is maintained even under conditions of momentary overload which would otherwise tend to force the gear and pinion teeth out of mesh by the provision of a carrier for the ring gear having a connection with the carrier for the sun pinions of the differential which allows for a degree of universal movement.

Various modifications may be made in the form of the ring gear carrier as well as its driving connection with the carrier for the sun pinions and no limitation is intended by the foregoing description or illustration of the application of the device except as indicated in the appended claims.

What I claim is:

1. In a drive for motor vehicles, the combination with a bevel pinion rotated by the propeller shaft and differential gearing for the live axles, of a bevel ring gear meshing with the pinion, an annulus, a splined connection between the annulus and the carrier for the differential planet pinions to mount said differential gearing, an annular bearing member and means to secure the ring gear, annulus and bearing member together.

2. In a drive for motor vehicles, the combination with a bevel pinion rotated by the propeller shaft and differential gearing for the live axles, of a bevel ring gear meshing with the pinion, a carrier for the bevel gear, bearings for the carrier, said carrier comprising the said bevel gear, an annulus, a bearing member and bolts to secure the parts together, and a splined connection between the annulus and the differential planet pinion carrier to mount the said differential gearing.

3. In a drive for motor vehicles, a driving connection between the propeller shaft and differential gearing for the live axles comprising, in combination, a carrier member so mounted in the differential housing as to have capacity for rotation therewithin but no capacity for relative angular displacement between its axis and the axis of the housing, means to drive said member from the propeller shaft, and means mounting the said differential gearing and permitting a degree of relative angular displacement between the normally coincidental axes of the carrier member and the differential gearing to drive the differential gearing from said member.

4. In a drive for motor vehicles, a differential housing, a bevel pinion carried with the propeller shaft of the vehicle mounted within the housing, a bevel ring gear meshing with the pinion, a carrier for the ring gear journaled in the housing in bearings one of which is on one side of the line of contact of the intermeshing gear teeth and in close proximity thereto and the other of which is on the other side of said line of contact but further therefrom than said first named bearing, differential gearing operatively associated with the live axle sections of the vehicle, and a spline-like connection between the carrier for the ring gear and the differential gearing to mount the differential gearing and to permit a degree of relative angular displacement between the normally coincident axes of said carrier and said differential gearing and to prevent deviation from the pitch line contact of the said intermeshing gears.

This specification signed this 5th day of March A. D. 1926.

AUGUST H. LEIPERT.